Figure 2:
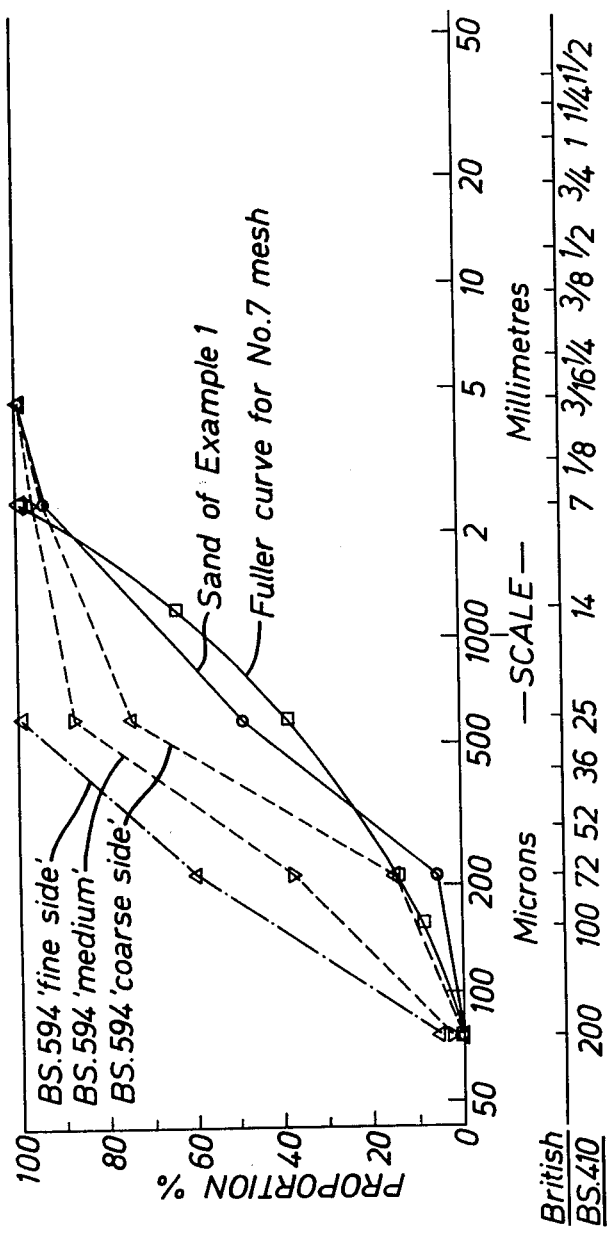

United States Patent [19]

Fabb et al.

[11] 4,196,922

[45] Apr. 8, 1980

[54] BITUMINOUS COMPOSITION

[75] Inventors: Terence R. J. Fabb, Weybridge; John V. Heyes, Woking, both of England

[73] Assignee: The British Petroleum Company Limited, London, England

[21] Appl. No.: 897,673

[22] Filed: Apr. 19, 1978

Related U.S. Application Data

[63] Continuation of Ser. No. 702,585, Jul. 6, 1976, abandoned.

[30] Foreign Application Priority Data

Jul. 10, 1975 [GB] United Kingdom ............... 29042/75

[51] Int. Cl.$^2$ ........................ C08L 95/00; F16L 13/02; F16L 58/12
[52] U.S. Cl. ...................................... 285/55; 106/280; 106/281 R; 138/145; 285/286; 428/36
[58] Field of Search ............ 106/280, 281 R; 428/36; 138/145; 285/55

[56] References Cited

U.S. PATENT DOCUMENTS

| | | | |
|---|---|---|---|
| 3,062,672 | 11/1962 | Kerkhoven et al. | 106/281 |
| 3,078,324 | 2/1963 | Timothy | 106/281 |

*Primary Examiner*—Allan Lieberman
*Attorney, Agent, or Firm*—Morgan, Finnegan, Pine, Foley & Lee

[57] ABSTRACT

A mastic asphalt suitable for coating underwater pipelines comprises

8–22% wt. bitumen,
8–25% wt. filler passing a 75 microns sieve,
84–53% wt. aggregate in the grading range from larger than 75 microns to a maximum particle size of from 2.36 to 37.5 mm., the aggregate having a grading curve close to a modified Fuller curve for particles of the maximum size chosen, the modified Fuller curve being the Fuller curve recalculated to exclude material passing 75 microns.

10 Claims, 4 Drawing Figures

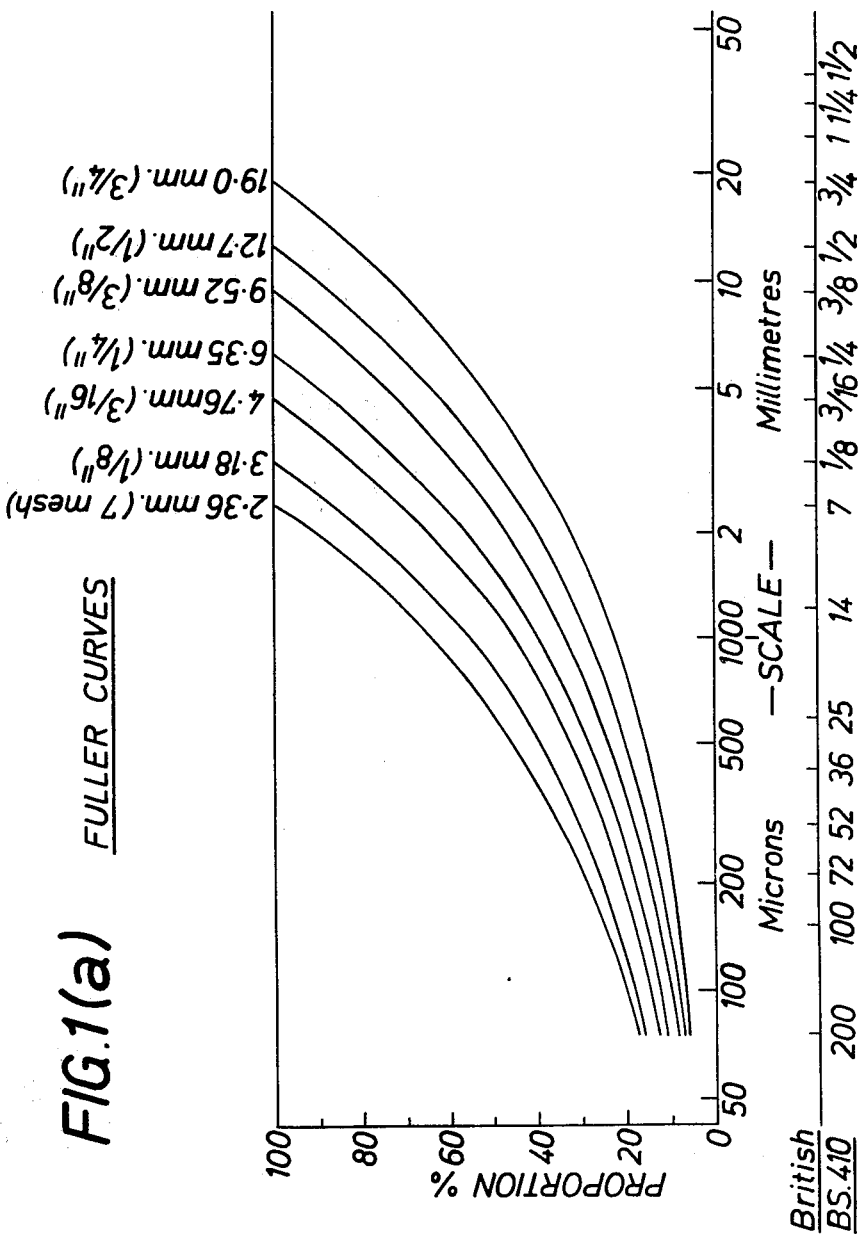

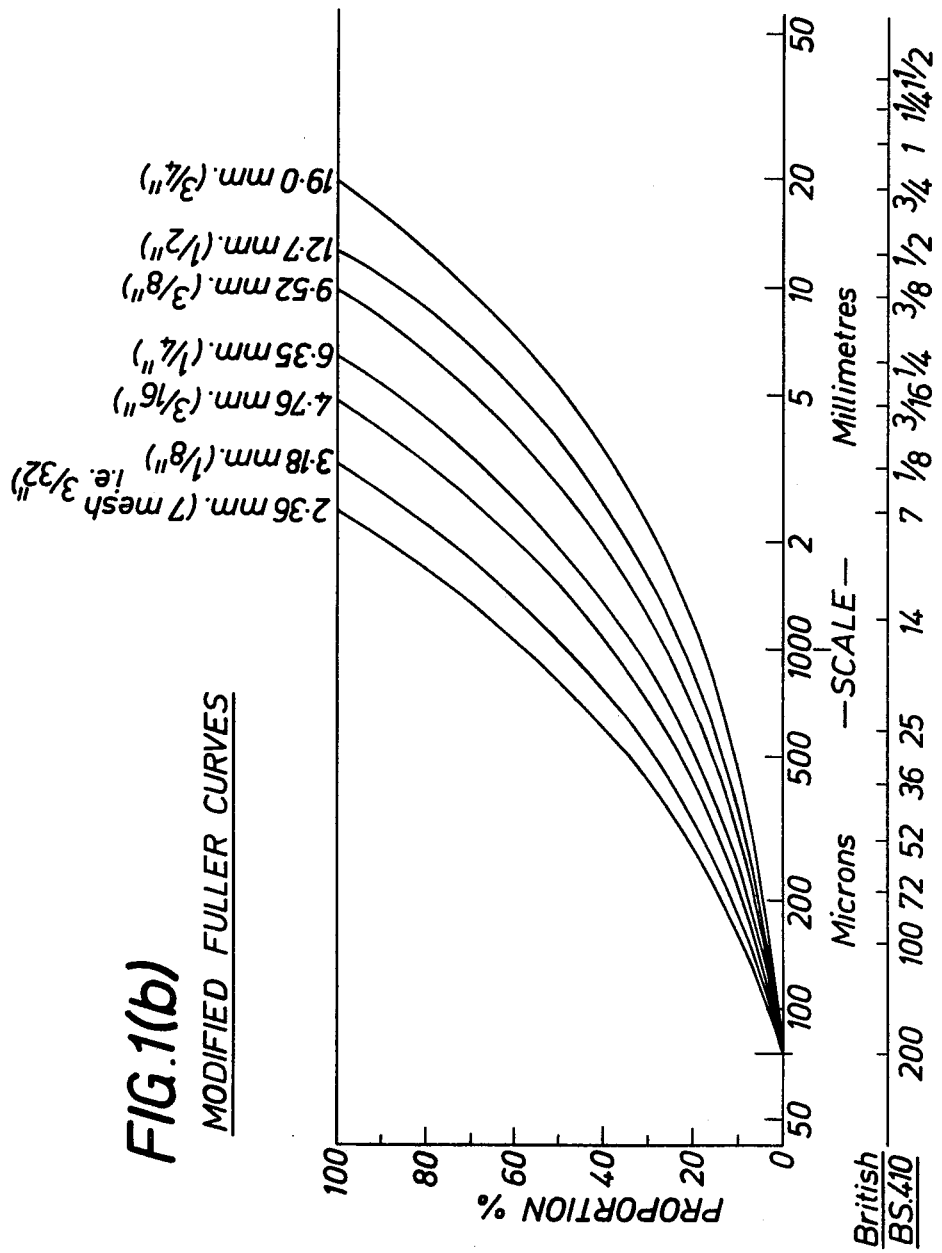

BITUMINOUS COMPOSITION

This is a continuation of application Ser. No. 702,585, filed July 6, 1976, now abandoned.

This invention relates to a bituminous composition of the mastic type, suitable for coating pipelines, particularly underwater pipelines.

Pipelines, particularly underwater pipelines, are usually coated with concrete, for protection and weighting, except at the ends of each length of pipe. The ends have to be left uncoated to allow the pipes to be welded together on site (e.g. on the lay barge). The gaps in the concrete coating at the welds then have to be filled with a relatively quick setting material. A mastic asphalt is normally used, the mastic being poured into a cylindrical mould surrounding the gap. The mineral portion of a mastic asphalt is normally crushed limestone, but for pipeline coating, sand is sometimes used. Gravel is also usually incorporated for economic reasons.

The search for crude oil and natural gas in off-short areas is increasing and hence the need for underwater pipelines is also increasing both for moving oil and gas from well heads to a gathering platform and/or transporting it ashore. The transport of oil products and other liquids or gases by underwater pipeline is less well developed but may increase. Depending on the quantity and type of fluid to be transported, the pipelines may have diameters requiring concrete coatings of up to 3 inches (76 mm) thick. The mastic for coating at the joints will have essentially the same thickness as the concrete.

A typical mastic asphalt for underwater pipelines is formed of
- 20% wt bitumen,
- 20% wt limestone or cement filler (passing 200 mesh BSS),
- 40% wt sand to BS 594 standard,
- 20% wt pea gravel ($\frac{1}{4}$ to $\frac{3}{8}$ inch), With such a mix, however, there is a pronounced tendency for the gravel to segregate both during manufacture and coating. This problem can be overcome by omitting the gravel but this increases cost.

It has now been found that the BS 594 standard sand grading, used in the manufacture of hot rolled asphalt for paving, is not the best standard for mastic asphalts based on sand.

According to the present invention, therefore, a mastic asphalt comprises
- 8–22% wt of bitumen,
- 8–25% wt of filler passing a 75 microns (200 mesh BSS), sieve, and
- 84–53% wt of aggregate in the grading range from larger than 75 micron (200 mesh) to a maximum particle size of from 2.36 mm (7 mesh BSS) to 37.5 mm (1$\frac{1}{2}$ inches BSS) the aggregate having a grading curve close to a modified Fuller curve for particles of the maximum particle size chosen, said modified Fuller curve being the Fuller curve recalculated to exclude material passing 75 microns.

Fuller curves are grading curves which give the minimum void space and closest packing and thus the lowest void space for sands and other mineral aggregates containing particles of varying size. The shape of a Fuller curve depends on the maximum particle size but will be a single curve for any given maximum particle size. Particle shape also has some effect on packing but the present invention has been found to be effective with aggregates which are a mixture of round and angular particles obtained from both natural and crushed aggregates. The precise particle shape is not, therefore, considered critical.

Fuller curves are based on the observation that, for lowest void space, the particle size distribution follows a certain law, viz Percentage passing any sieve =

$$100 \sqrt{\frac{\text{aperture size of that sieve}}{\text{size of the largest particle}}}$$

Fuller curves can thus be calculated mathematically using the above formula. The law was first enunciated in a paper by Fuller and Thompson entitled "The Laws of Proportioning Concrete", published in the Transactions of the American Society of Civil Engineers, 1907, 59, pages 67–172. In the following text, various Fuller curves will be identified by the nominal size of the largest particles present e.g. "The 2.36 mm Fuller curve" is the Fuller curve for aggregate whose maximum particle size is 2.36 mm.

Some tolerance is necessary to allow for the fact that in a real aggregate blend whose nominal grading is that of a certain Fuller curve, there may be a small amount of aggregate present which is actually of a larger size than that designated. Consequently, the aggregate is defined as "close to the Fuller curve" and, by that, we mean that the end points of the grading curve are not more than 5% above or below the Fuller curve and that any intermediate point on the curve is not more than 10% above or below the Fuller curve.

The filler content of a mastic has a dual function, acting partly as the finest portion of the mineral content and partly as a stiffener and modifier of the bitumen. For aggregate close to the 2.36 mm Fuller curve, it so happens that the amount of material smaller than 75 microns on this Fuller curve is approximately that required as filler to give a good mastic. Hence for 2.36 mm maximum particle size either the normal or the modified Fuller curve can be used as a criterion. However, as the maximum particle size increases, so the amount passing 75 microns on the Fuller curve decreases to a point where it may be insufficient in relation to the required bitumen content. For larger maximum particle size aggregates, therefore, the correlation should be between the aggregate grading (without filler) and the modified Fuller curve. The amount passing any given mesh on a modified Fuller curve can be calculated from the normal Fuller curve as follows Amount passing a given size mesh on modified Fuller curve =

$$\frac{\left(\begin{array}{l}\text{amount passing that size} \\ \text{mesh on normal Fuller} \\ \text{curve}\end{array} - \begin{array}{l}\text{amount passing 75} \\ \text{microns mesh on} \\ \text{normal Fuller curve}\end{array}\right)}{100 - \text{amount passing 75 microns on normal Fuller curve}} \times 100$$

The aggregate in the range of larger than 75 microns may conveniently be sand with or without gravel and may be natural or crushed material or a mixture of natural and crushed material.

The filler may be any suitable known mastic filler e.g. limestone, Portland cement or lime. The term "filler" implies that the material has particle sizes essentially of 75 microns or less. It is to be understood also, however, that the filler content is the total filler content, including any contribution from fines present in the coarser aggregate used.

The bitumen may have a penetration of from 10 to 100 at 25° C., preferably from 20 to 30. It may be petroleum bitumen or coal tar pitch or a mixture, and may be straight run or blown. The bitumen may contain a minor proportion of a rubber or other polymer to modify its visco-elastic properties. The precise amount of bitumen required will depend on the grading of the aggregate, particularly its maximum particle size and may be chosen, by experiment if necessary, to give good pouring properties with minimum bitumen contents. In general, for any given maximum particle size aggregate, the present invention allows a reduction in the amount of bitumen used as compared with previously used asphalts. The amount of bitumen is still, however, in excess of that required merely to fill the voids between the mineral particles.

The softening point (Ring and Ball) of the bitumen may be from 40° to 115° C. and may be varied depending on the temperature the mastic is likely to be subjected to. Crude oil at a wellhead may have a temperature as high as 80° C. and mastic for crude oil gathering lines preferably uses blown bitumen with a softening point of 70°-115° C. In main crude oil transport lines, the crude oil temperatures are likely to be lower and straight run bitumens with softening points of 40°-70° C. should be adequate.

The relative proportions of bitumen, filler and aggregate within the defined ranges will clearly need to be selected for any given mastic. The optimum bitumen:-filler ratio may be of the order of 1:1 and the bitumen and filler contents can be decreased as the maximum particle size of the aggregate increases. Experiments have shown for example, that mastics of comparable pourability and other qualities can be obtained with the following relationship between bitumen and filler contents and aggregate maximum particle size

| Aggregate maximum particle size | 2.36mm | 4.76mm | 9.52mm | 19.0mm |
| --- | --- | --- | --- | --- |
| Bitumen % wt | 17 | 15 | 13 | 11 |
| Filler % wt | 17 | 15 | 13 | 11 |

The maximum particle size of the aggregate should obviously not exceed the thickness of the mastic coating and may preferably be from ⅛ to ⅓ of the thickness.

Figure 3:
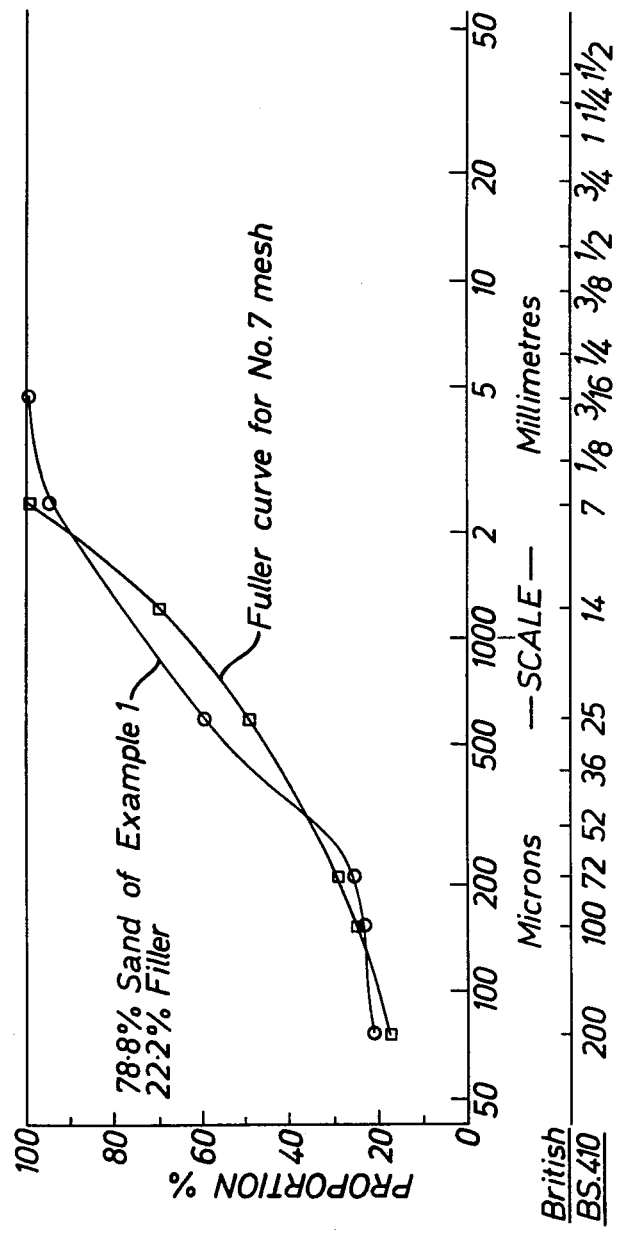

The invention is illustrated by the accompanying drawings FIGS. 1 to 3 and the following Examples.

FIG. 1(a) shows a set of Fuller curves for aggregates having maximum particles sizes ranging from 2.36 mm to 19 mm. These curves were obtained by calculation using the first formula given above. FIG. 1(b) shows the Fuller curves of FIG. 1(a) recalculated to exclude the material passing 75 microns.

EXAMPLE 1

A mastic asphalt was produced by mixing
17.5% wt straight run bitumen having a penetration of 26 at 25° C. and a Ring and Ball softening point of 65° C.,
17.5% wt limestone filler passing 75 microns,
65% wt sand having a grading curve as shown on the accompanying FIG. 2.

FIG. 2 also shows a curve for sand having a maximum particle size of 2.36 mm. This curve is the appropriate Fuller curve recalculated to allow for the absence of material passing the 75 microns sieve. The sand used had a small proportion of material up to 4.76 mm, but this was not sufficient to have a significant affect on the asphalt produced. Also shown on FIG. 2 is the grading curve envelope for sand according to BS 594 and its median line. It will be seen that the grading curve for the sand used was relatively close to the 2.36 mm modified Fuller curve and considerably different from the BS 594 sand, having a more continuous grading throughout the particle size range.

FIG. 3 shows the grading curve for the sand when combined with filler (the proportions by weight of total aggregate and excluding the bitumen being 78.8% sand and 22.2% filler) and the 2.36 mm Fuller curve. Again the close similarity of the curves will be apparent.

The asphalt produced was tested for pourability and segregation both in the laboratory and by full scale tests. In the laboratory, pourability was assessed visually and subjectively at 150°-190° C., there being no standard test for pourability. Segregation of aggregate was assessed by pouring 500-1000 g of the asphalt into a cylindrical steel mould. This was maintained in an oven at 160° C. for 2 hours, without stirring, it was then allowed to cool after which the steel cylinder was removed. The sample was cut in half by a diamond saw and the extent of segregation assessed visually.

The full scale tests were carried out using a 36 inch diameter pipe and a 40 inch diameter cylindrical mould around the pipe and filling the space between with asphalt by pouring at 170° C. After cooling, the mould was removed and segregation assessed by analysing portions of the asphalt removed from various positions around the pipe.

In both the laboratory and the full scale tests, the pourability of the asphalt was as good as the known asphalt based on BS 594 sand and pea gravel. There was also negligible segregation of the larger particles. With the previously known asphalt, however, there was extensive segregation of the gravel in both tests.

EXAMPLE 2

A mastic asphalt was produced by mixing
11% wt bitumen as in Example 1,
11% wt limestone filler passing 75 microns,
78% wt sand and gravel (75 microns up to 19.0 mm).
The aggregate (sand and gravel) had the grading of a modified Fuller curve for 19.0 mm maximum particle size material recalculated to exclude sand passing 75 microns, as shown in FIG. 1(b). When tested for pourability and segregation in the laboratory as described in Example 1, pourability was good and there was negligible segregation of aggregate despite the fact that particles as large as 19.0 mm were present.

EXAMPLE 3

A mastic asphalt was produced by mixing
17% wt blown bitumen having a penetration of 26 at 25° C. and a Ring and Ball softening point of 85° C.,
19.5% wt limestone filler passing 75 microns,
63.5% wt sand as in Example 1.

The mastic had the same qualities of pourability and non-segregation as the mastic of Example 1 and in addition, could be heated to 75° C. without significant deformation or slumping, as compared with a temperature of 60° C. for the mastic of Example 1.

We claim:

1. A mastic asphalt pourable at temperatures in the order of 170° C., suitable for coating pipelines, comprising
    8–22% wt of bitumen having a penetration of from 10 to 100 at 25° C. and a Ring and Ball softening point of from 40° to 115° C.;
    8–25% wt of filler passing a 75 microns sieve; and
    84–53% wt of aggregate in the grading range from larger than 75 microns to a maximum particle size of from 2.36 mm to 37.5 mm, the aggregate having a grading curve close to a modified Fuller curve for particles of the maximum particle size chosen, said modified Fuller curve being the Fuller curve recalculated to exclude material passing 75 microns.

2. A mastic asphalt as claimed in claim 1 wherein the bitumen has a penetration of from 20 to 30 at 25° C.

3. A mastic asphalt as claimed in claim 1 wherein the bitumen is a straight run bitumen having a Ring and Ball softening point of 40° to 70° C.

4. A mastic asphalt as claimed in claim 1 wherein the bitumen is a blown bitumen having a Ring and Ball softening point of 70° to 115° C.

5. A pipeline coated, at least in part, with a mastic asphalt as claimed in claim 1.

6. A pipeline as claimed in claim 5 which is an underwater pipeline coated at its joints with a mastic as claimed in claim 1.

7. A mastic asphalt as claimed in claim 1 wherein the bitumen:filler ratio is of the order of 1:1.

8. The mastic asphalt of claim 1 wherein said aggregate is selected from the group consisting of sand, gravel and mixtures thereof and wherein said filler is selected from the group consisting of limestone, Portland cement, lime and mixtures thereof.

9. The mastic asphalt of claim 1 wherein the filler content includes the fines portion of the aggregate having particle sizes of 75 microns or less.

10. In a method for coating pipelines wherein said method includes the steps of placing a cylindrical mold around the outer circumference of the portion of the pipe to be coated, pouring a mastic asphalt composition into the space between the pipe surface and mold to fill said space, and removing the mold after the asphalt composition has cooled, the improvement which comprises using as the mastic asphalt the composition of claim 1 and pouring that composition into the space between the pipe surface and mold at a temperature in the order of 170° C.

* * * * *